United States Patent
Laumanns (10) Patent No.: US 11,926,187 B2
(45) Date of Patent: Mar. 12, 2024

(54) METHOD AND DEVICE FOR CONTROLLING VEHICLE LATERAL DYNAMICS

(71) Applicant: Volkswagen Aktiengesellschaft, Wolfsburg (DE)

(72) Inventor: Nando Laumanns, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 825 days.

(21) Appl. No.: 16/976,307

(22) PCT Filed: Feb. 25, 2019

(86) PCT No.: PCT/EP2019/054507
§ 371 (c)(1),
(2) Date: Aug. 27, 2020

(87) PCT Pub. No.: WO2019/166349
PCT Pub. Date: Sep. 6, 2019

(65) Prior Publication Data
US 2021/0138861 A1    May 13, 2021

(30) Foreign Application Priority Data
Mar. 2, 2018  (DE) .......... 10 2018 203 182

(51) Int. Cl.
*B60G 17/016*    (2006.01)

(52) U.S. Cl.
CPC .. *B60G 17/0162* (2013.01); *B60G 2400/0523* (2013.01); *B60G 2400/202* (2013.01);
(Continued)

(58) Field of Classification Search
CPC ........ B60G 17/0162; B60G 2400/0523; B60G 2400/202; B60G 2400/204;
(Continued)

(56) References Cited

U.S. PATENT DOCUMENTS 7,949,445 B2    5/2011  Poilbout
8,005,591 B2    8/2011  Poilbout
(Continued)

FOREIGN PATENT DOCUMENTS

DE           10226683 A1   12/2003
DE      102004007549 A1    9/2005
(Continued)

OTHER PUBLICATIONS

Machine Translated KR101558761B1 (Year: 2010).*
PCT/EP2019/054507. Int'l Search Report (dated May 14, 2019).
DE 10 2018203182. Office Action (dated Oct. 25, 2018).

*Primary Examiner* — Anne Marie Antonucci
*Assistant Examiner* — Misa H Nguyen
(74) *Attorney, Agent, or Firm* — Peter Zura; LOZA & LOZA, LLP (57) ABSTRACT

Technologies and techniques for producing a yawing movement in order to control the driving dynamics of a vehicle. A target yawing movement of the vehicle is determined from a target yaw rate preset by a preset steering angle, such that the vehicle can pass through the preset steering angle at the current vehicle speed, and the target yawing movement being divided into a steering yawing movement produced by the steering system, a rolling yawing movement and a drive yawing movement, wherein the rolling yawing movement is divided into individual rolling yawing movements of the individual wheels, which can be variably set.

13 Claims, 4 Drawing Sheets

(52) U.S. Cl.
CPC .... *B60G 2400/204* (2013.01); *B60G 2400/41* (2013.01); *B60G 2500/10* (2013.01)

(58) Field of Classification Search
CPC ............ B60G 2400/41; B60G 2500/10; B60G 2800/012; B60G 2800/24; B60G 17/08; B60G 17/0195; B60G 2800/016; B60T 2260/06; B60T 8/17555; B60T 8/1755; B60W 30/025; B60W 10/22; B60W 40/112; B60W 40/114; B60W 2540/18; B60W 2710/226; B60W 2720/14; B60W 2720/18
See application file for complete search history.

(56) References Cited

U.S. PATENT DOCUMENTS

| | | | |
|---|---|---|---|
| 8,060,277 B2 | 11/2011 | Poilbout | |
| 8,718,872 B2 | 5/2014 | Hirao et al. | |
| 8,855,856 B2 | 10/2014 | Ryu et al. | |
| 8,880,293 B2 | 11/2014 | Hirao et al. | |
| 2008/0040000 A1 | 2/2008 | Chen et al. | |
| 2009/0108671 A1* | 4/2009 | Maeda | B60W 30/04 303/146 |
| 2010/0228444 A1* | 9/2010 | Kojo | B60W 30/18145 701/41 |
| 2013/0079988 A1 | 3/2013 | Hirao et al. | |
| 2015/0025741 A1* | 1/2015 | Muller | B60G 17/0195 701/38 |
| 2017/0197485 A1* | 7/2017 | Sohn | B60G 17/0182 |

FOREIGN PATENT DOCUMENTS

| | | | |
|---|---|---|---|
| DE | 102004047860 A1 | 4/2006 | |
| DE | 102007051226 A1 | 4/2009 | |
| DE | 102011080104 A1 | 4/2012 | |
| DE | 102014016857 A1 | 6/2015 | |
| DE | 102014214272 A1 | 1/2016 | |
| KR | 101558761 B1 * | 10/2015 | .......... B60W 40/114 |
| WO | 2008021676 A2 | 2/2008 | |

* cited by examiner

METHOD AND DEVICE FOR CONTROLLING VEHICLE LATERAL DYNAMICS

RELATED APPLICATIONS

The present application claims priority to international patent app. no. PCT/EP2019/054507 to Nando Laumanns, filed Feb. 25, 2019, which claims priority to German patent app. no. DE 10 2018 203 182.7, filed Mar. 2, 2018, the contents of each being incorporated by reference in their entirety herein.

BACKGROUND

The present disclosure relates to technologies and techniques for controlling vehicle lateral dynamics.

There are normally numerous driving dynamics control systems in vehicles, each of which can independently affect the driving performance of the vehicle. This independence results in a great deal of difficulty in coordinating and testing the numerous driving dynamics control systems in a vehicle.

Adaptive chassis controls, referred to as Dynamic Chassis Controls (DCCs), can be increasingly found in modern vehicles. Such systems differ from conventional chassis in that they are configured with electronically regulated dampers with which the damping performance can be controlled.

In differing from a conventional chassis, the configuration of the spring-damper coordination in a dynamic chassis control requires fewer compromises. When the damping is not regulated, it must be decided whether the chassis should be configured more for comfort or for performance. This is not the case with dynamic control. Under normal conditions, the work of the springs is dampened only a little, while an automatically stiffened damping ensures greater stability when desired. A dynamic chassis reacts constantly to the roadway as well as the driving situation, and transmits this information to the four regulated dampers. The system orients itself during "normal driving" on the signals from the structure and wheel direction sensors. Based on this, the damping is set up to one thousand times per second for each wheel. The damping is stiffened in a targeted manner during acceleration, braking or turning, in order to reduce pitch and rolling motions. The damper control evaluates the signals from the electromechanical power steering, the motor, the transmission, the brake system, and the driver assistance system for this. A dynamic chassis is therefore more comfortable, and more importantly, offers increased driving safety.

Such a dynamic chassis control is described in DE 10 2014 214 272 A1, which discloses a device and a method for determining a resulting yaw moment for controlling driving dynamics. At least one driving dynamics target value is determined therein, and based on the at least one driving dynamics target value, at least one reference yaw moment, at least one available supplementary yaw moment, and/or at least one existing supplementary yaw moment are determined. A resulting yaw moment is determined based on the reference yaw moment and the at least one available and/or existing supplementary yaw moment. This document also discloses a method for driving dynamics control and a corresponding vehicle.

DE 10 2007 051 266 A1 describes a damper system for a motor vehicle. The aim of the damper system is to reduce the target conflicts between driving comfort, with a comfortable, soft configuration, and driving dynamics, with high performance, stiffer configurations, in that adjustable dampers regulate the state of the configuration via a control system. In contrast to the control systems that can be purchased commercially, the target conflict between driving comfort and driving safety/driving dynamics is substantially resolved by a special incorporation of state values.

U.S. Pat. No. 8,880,293 B2 relates to a device for controlling vehicle movement, including a device for controlling braking forces, which generates a braking force during a turning maneuver. The control device also comprises numerous devices that generate forces, which are located between the auto body and each wheel on the vehicle, a unit for regulating the force of each force generating device, and a unit for calculating a target pitch state from the state the vehicle is in. The unit for regulating forces controls the forces of each force generating device such that the pitch state of the vehicle approaches the calculated target pitch state.

Improved determination of a necessary yaw moment for generating desired vehicle lateral dynamics is needed in the art.

BRIEF DESCRIPTION OF THE DRAWINGS

A preferred embodiment of the invention shall be explained below in reference to the drawings. Therein.

DETAILED DESCRIPTION

The present disclosure illustrates various embodiments for generating a yaw moment in order to control the driving dynamics of a vehicle, in which a target yaw moment is determined from a target yaw rate defined by a predetermined steering angle, in order that the vehicle can actually maintain the predefined steering angle at the current vehicle speed, in which the target yaw moment is subdivided into a steering yaw moment generated by the steering, a rolling yaw moment, and a drive yaw moment. The rolling yaw moment may be subdivided into individual rolling yaw moments for the individual wheels, which can be dynamically adjusted. As a result of the individual control of the individual wheels, the lateral forces of the wheels applied to the roadway are optimized.

In some examples, the existing drive yaw moment and a maximum possible rolling yaw moment are also incorporated in the determination of the distribution of the target yaw moment. This limits the distribution of the target yaw moment.

In some examples, a rolling yaw moment is also determined from the target yaw moment, taking the maximum possible rolling yaw moment into account, which is then set at the wheels.

In some examples, the rolling yaw moment that is to be set may be depicted as the sum of all of the adjustable individual rolling yaw moments at each of the wheels of the vehicle. As a result of the individual settings, the possible lateral force can be optimized, such that the vehicle displays a better cornering performance.

The individual rolling yaw moments for the individual wheels may be obtained by activating the dampers for the wheels, in which the rolling yaw moments of the individual wheels are preferably obtained by supplying the dampers with energy individually.

The damping forces of the dampers may be determined by modeling the rolling behavior of the vehicle and a determination of the roll angle and its derivations, by means of which the damping force is dynamically distributed to the wheels through an activation of the dampers.

The speed at which the dampers move the wheels may also be estimated, such that the power that needs to be supplied to the dampers is determined from the damper speed.

In some examples, an apparatus is disclosed for generating a yaw moment for controlling the driving dynamics of a vehicle, wherein the apparatus may be configured to control the driving dynamics of a vehicle. The vehicle may be configured with a chassis equipped with electrically activated dampers, and further include a device for determining a target slip angle and a target yaw rate from a steering angle, a device for determining a target yaw moment from the target slip angle and the target yaw rate, a device for subdividing the target yaw moment into a steering yaw moment of a steering device, a rolling yaw moment of a rolling control, and a drive yaw moment of a drive control, wherein the rolling control is configured to subdivide the rolling yaw moment into individual rolling yaw moments for the individual wheels.

The lateral forces of the vehicle applied to the roadway can be optimized or increased by the device, resulting in a safer driving performance.

The different rolling yaw moments of the individual wheels may also be obtained by supplying different currents to the individual dampers in the respective wheels.

Figure 1:
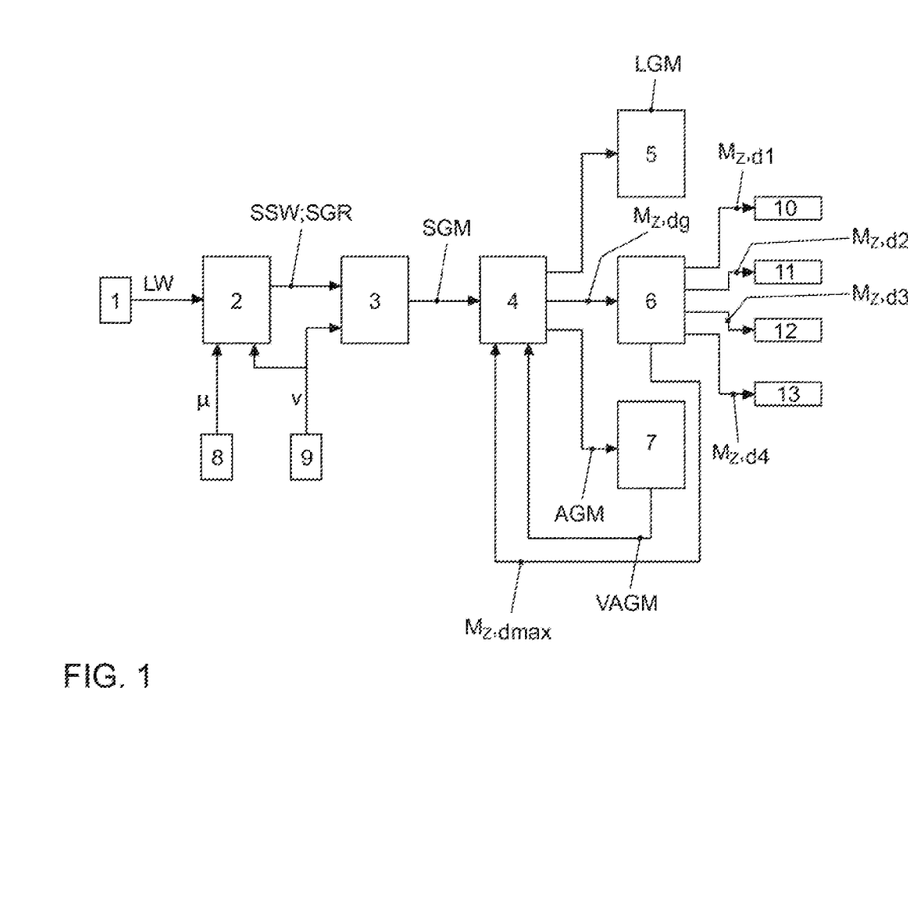
FIG. 1 shows a yaw moment regulation in a motor vehicle, in a schematic illustration.

FIG. 1 shows a yaw moment control for a vehicle, in particular a motor vehicle, in a schematic illustration under one example. A steering angle LW may be defined by the driver using an input device 1, such as a steering wheel. This steering angle LW forms an input value for a subsequent device 2 for determining a target yaw rate SGR and a target slip angle SSW for the vehicle, wherein the determination of these target values takes place, e.g. using a non-inverted vehicle model, in particular a non-inverted single track model, of the vehicle that is to be controlled. Further input values for determining the target yaw rate SGR and the target slip angle SSW may include the speed v of the vehicle, and optionally, the friction coefficient μ of the vehicle wheels on the roadway. The speed v is determined with a speed sensor 9, and the friction coefficient μ is determined with a stability mechanism 8 in the vehicle.

The desired target yaw moment SGM for the vehicle is determined from the target values for the target yaw rate SGR and the target slip angle SSW obtained in this manner in a device 3, taking the vehicle speed v into account. The target yaw moment SGM corresponds to the yaw moment of the vehicle that is necessary for the vehicle to be able to maintain the desired steering angle LW at the current vehicle speed v.

The target yaw moment SGM is sent to a device 4 in which the target yaw moment SGM is subdivided into individual components that the vehicle can generate, such that the sum therefore results in balanced vehicle dynamics. The target yaw moment SGM may therefore be subdivided in the distribution device 4 into a steering yaw moment LGM generated by the steering, a rolling yaw moment $M_{z,dg}$, generated by the regulated dampers, and a drive yaw moment AGM generated y the drive. The existing drive yaw moment VAGM and a maximum possible rolling yaw moment $M_{z,dmax}$ are sent to the distribution device 4 to determine the distribution of the target yaw moment SGM.

The steering yaw moment LGM determined by the distribution device 4 is sent to the steering device 5 in the vehicle, the determined rolling yaw moment $M_{z,dg}$ is sent to the rolling control 6 in the vehicle, and the determined drive yaw moment AGM is sent to the drive control 7 in the vehicle. The drive control 7 determines the existing drive torque VAGM and sends it back to the distribution device 4 in a return loop as a starting value.

The rolling yaw moment $M_{z,dg}$ is analyzed in the rolling control 6 distributed to the existing regulated dampers, wherein each regulated damper has a separate damper control 10, 11, 12, and 13. It is assumed in the example shown in FIG. 1 that there are four damper controls for four regulated dampers in a four-wheeled vehicle. If the vehicle has fewer or more regulated dampers, then there are fewer or more damper controls. The rolling yaw moment is therefore subdivided into a rolling yaw moment $M_{d,z1}$ set via the first damper, a rolling yaw moment $M_{z,d2}$ set at the second damper, a rolling yaw moment $M_{z,d3}$ set at the third damper, and a rolling yaw moment $M_{z,d4}$ set at the fourth damper, as shall be explained below in greater detail in reference to FIG. 2.

Figure 2:
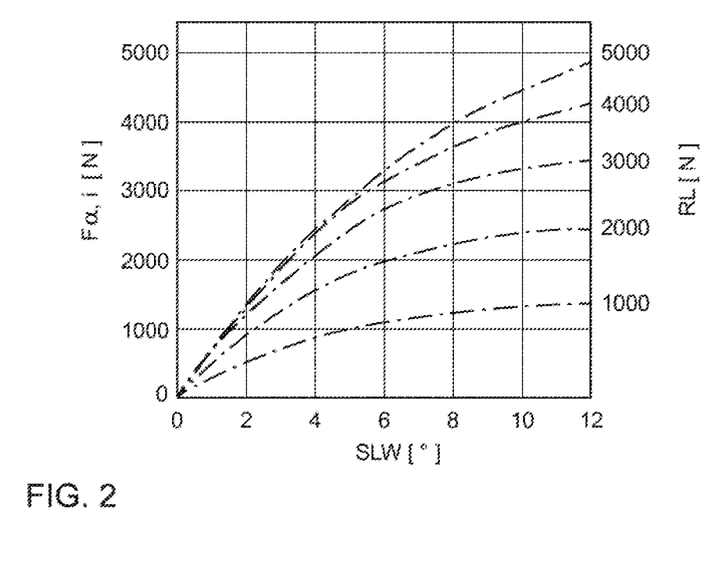
FIG. 2 shows the relationship between the vertical wheel forces, the slip angle, and lateral forces.

FIG. 2 shows the connection between the lateral tire force $F_{\alpha,i}$ on the left, the skew angle plotted on the right, and the wheel load for 1000 N, 2000 N, 3000 N, 4000 N, and 5000 N depicted in the form of five curves. FIG. 2 illustrates that, for a predetermined skew angle SLW and a predetermined wheel load RL, the generated lateral tire force $F_{\alpha,i}$ can be obtained at the left-hand vertical axis.

If, for example, two tires on an axle generate a wheel load of 6000 N, it can be derived from FIG. 2 that the lateral tire force is then at the maximum when both tires have a wheel load of 3000 N. All other combinations have a lower total lateral tire force, which is a function of the skew angle SLW. By way of example, when curving, the outer tires can generate a wheel load of 5000 N, and the inner tires can generate a wheel load of 1000 N. It can then be seen from FIG. 2 that the total lateral force for a wheel load of 5000 N and a wheel load of 1000 N is smaller for all skew angles SLW than the total lateral force of the 3000 N for the outer tires and 3000 N for the inner tires.

By appropriately activating the regulated dampers, it is therefore possible to distribute the difference in wheel loads to the axles and therefore increase or reduce the overall lateral force on the axles, which can be achieved through a corresponding activation of the dampers.

The overall rolling yaw moment $M_{z,dg}$ generated via the damper control 6 in FIG. 1 can be calculated as follows:

$$M_{z,dg} = \Delta M_{z,d1} + \Delta M_{z,d2} + \Delta M_{z,d3} + \Delta M_{z,d4} \qquad (1),$$

where:

$$\Delta M_{z,d1} = -\left(-\frac{\partial F_{\alpha 1}}{\partial F_{z,d1}} \cdot \Delta F_{z,d1} \cdot \sin\delta_v + \frac{\partial F_{\lambda 1}}{\partial F_{z,d1}} \cdot \Delta F_{z,d1} \cdot \cos\delta_v\right) \cdot \frac{b}{2} + \qquad (2)$$
$$\left(\frac{\partial F_{\alpha 1}}{\partial F_{z,d1}} \cdot \Delta F_{z,d1} \cdot \cos\delta_v + \frac{\partial F_{\lambda 1}}{\partial F_{z,d1}} \cdot \sin\delta_v\right) \cdot l_v,$$

$$\Delta M_{z,d2} = -\left(-\frac{\partial F_{\alpha 2}}{\partial F_{z,d2}} \cdot \Delta F_{z,d2} \cdot \sin\delta_v + \frac{\partial F_{\lambda 2}}{\partial F_{z,d2}} \cdot \Delta F_{z,d2} \cdot \cos\delta_v\right) \cdot \frac{b}{2} + \qquad (3)$$
$$\left(\frac{\partial F_{\alpha 2}}{\partial F_{z,d2}} \cdot \Delta F_{z,d2} \cdot \cos\delta_v + \frac{\partial F_{\lambda 2}}{\partial F_{z,d2}} \cdot \sin\delta_v\right) \cdot l_v,$$

$$\Delta M_{z,d3} = -\left(-\frac{\partial F_{\alpha 3}}{\partial F_{z,d3}} \cdot \Delta F_{z,d3} \cdot \sin\delta_h + \frac{\partial F_{\lambda 3}}{\partial F_{z,d3}} \cdot \Delta F_{z,d3} \cdot \cos\delta_h\right) \cdot \frac{b}{2} + \quad (4)$$
$$\left(\frac{\partial F_{\alpha 3}}{\partial F_{z,d3}} \cdot \Delta F_{z,d3} \cdot \cos\delta_h + \frac{\partial F_{\lambda 3}}{\partial F_{z,d3}} \cdot \sin\delta_h\right) \cdot l_h,$$

and $$\Delta M_{z,d4} = -\left(-\frac{\partial F_{\alpha 4}}{\partial F_{z,d4}} \cdot \Delta F_{z,d4} \cdot \sin\delta_h + \frac{\partial F_{\lambda 4}}{\partial F_{z,d4}} \cdot \Delta F_{z,d4} \cdot \cos\delta_h\right) \cdot \frac{b}{2} + \quad (5)$$
$$\left(\frac{\partial F_{\alpha 4}}{\partial F_{z,d4}} \cdot \Delta F_{z,d4} \cdot \cos\delta_h + \frac{\partial F_{\lambda 4}}{\partial F_{z,d4}} \cdot \sin\delta_h\right) \cdot l_h,$$

with the following notations:

$M_{z,dg}$—total yaw moment by means of the damper control
$M_{z,d1}$—yaw moment at front left wheel
$M_{z,d2}$—yaw moment at front right wheel
$M_{z,d3}$—yaw moment at rear left wheel
$M_{z,d4}$—yaw moment at rear right wheel
$F_{z,di}$—vertical force (z-axis) at wheel i
$F_{\alpha i}$—lateral force at wheel i
$F_{\lambda i}$—longitudinal force at wheel i
$\delta_v$—steering angle of front axle
$\delta_h$—steering angle of rear axle
b lane width
$l_v$ distance between the center of gravity and the front axle
$l_h$ distance between the center of gravity and the rear axle Using the equations (1) to (5), it is possible to calculate the differences in forces that must be set at the individual wheels by the regulated dampers to generate the rolling yaw moment $M_{z,dg}$. It is possible to approximate the speed at which the dampers move by modeling the vehicle movement. With a given relationship between the damper speed, damper force, and damper current, as shall be explained by way of example in reference to FIG. 3, the damper currents necessary for setting the yaw moment can be determined.

Figure 3:
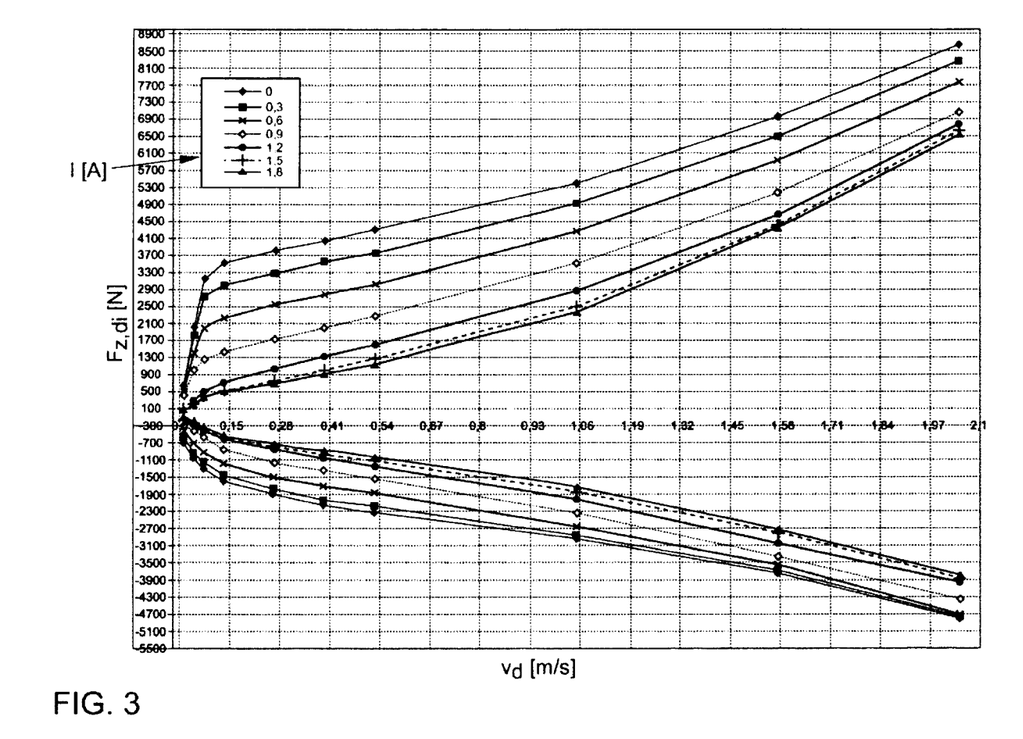
FIG. 3 shows a typical graph mapping regulated dampers.

FIG. 3 shows an example of a regulated damper. The damping force $F_{z,di}$ in the vertical direction z of a damper i is shown in newtons as a function of the damper speed $v_d$ in meters/second for various damper current feeds where I=0 to 1.8 A in steps of 0.3 A. It can be seen from the illustration in FIG. 3 that the damping force $F_{z,di}$ for the regulated damper i is affected by the current feed I that has been set, and the vertical force $F_{z,di}$ at the wheel can be set in this manner via the damper current feed, such that the yaw moment for the corresponding wheel can be affected and adjusted.

Figure 4:
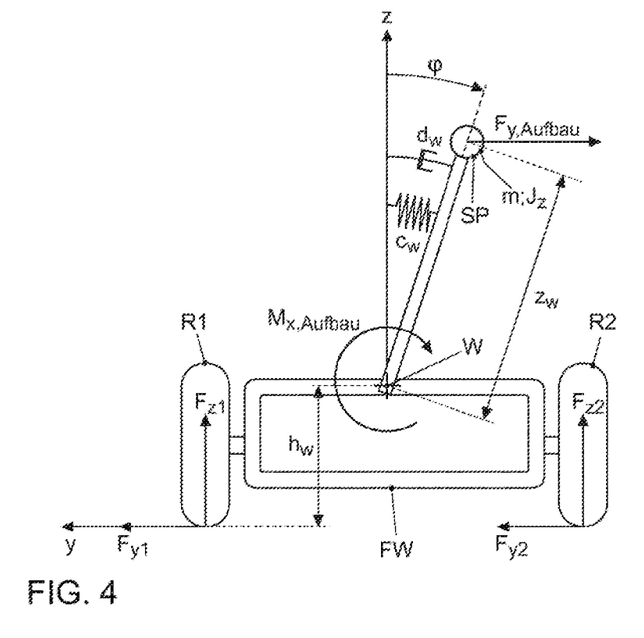
FIG. 4 shows a linear model system for determining the relationship between the vertical wheel forces and the yaw moment.

FIG. 4 shows a schematic illustration of the relationship between the wheel damping forces and the yaw moment based on a linear system in which the rolling behavior of a vehicle is visually and approximately depicted.

The structure of a vehicle, not explicitly shown in FIG. 4, is not rigidly coupled to the chassis. The vehicle is vibrated through springs, dampers, and stabilizers by excitations introduced into the vehicle via the tires when driving on a street. If only the movement of the vehicle about its x-axis running in its longitudinal direction is observed, the rolling behavior of the vehicle can be described by a simple linear model. The front and rear axles are combined for this model, and the rolling axis in the x-axis forms a rolling pole. It is also assumed that the lateral acceleration acts on the structural center of gravity. All of the forces in the springs, dampers, and stabilizers are caused by this lateral acceleration. A rolling moment of inertia $J_z$, a rolling damping $d_w$, and a rolling stiffness $c_w$ are used for modeling the rolling dynamics.

FIG. 4 shows the model with a single-axle chassis FW, in which the front and rear axles are combined, the left and right wheels R1, R2 of the single-axle chassis FW, and the rolling pole W, which is located at a height $h_W$ above the road surface. Forces act on the wheels R1, R2 along the y-axis $F_{y1}$, $F_{y2}$ and along the z-axis $F_{z1}$, $F_{z2}$. Centrifugal force $F_{y,\,Aufbau}$ acts on the structural center of gravity SP, resulting in a deflection of the vehicle structure in relation to the z-axis at a roll angle φ.

The distance between the rolling pole W and the structural center of gravity SP is $z_W$, referred to as the rolling leverage. Assuming that the cosine of the roll angle is approximately 1, i.e. cos(φ)≈1, the centrifugal force $F_{y,Aufbau}$ generates the following rolling torque $M_{x,Aufbau}$:

$$M_{x,Aufbau} = F_{y,Aufbau} \cdot z_w$$

This rolling torque $M_{x,Aufbau}$ is obtained from the rolling moment of inertia $J_z$ located in the structural center of gravity, the rolling damping $d_W$, and the rolling stiffness $c_W$ as a function of the roll angle φ, as follows:

$$M_{x,Aufbau} = J_z \cdot \ddot{\varphi} + d_W \cdot \dot{\varphi} + c_W \cdot \varphi,$$

where the speed force portion $M_{x,G}$ of the rolling torque $M_{x,Aufbau}$, specifically:

$$M_{x,G} = m \cdot g \cdot z_W \cdot \sin(\varphi)$$

is approximated in the rolling stiffness $c_W$.

The roll angle φ can be measured by different sensors. Furthermore, the damping force Fd=($d_W \cdot \dot{\varphi}$)/$z_W$ can be dynamically distributed to the individual wheels by activating the damper valves. This results in a corresponding change in the wheel loads. By increasing the wheel load, the maximum lateral force that can be transferred is increased, but this increase diminishes, as is shown in FIG. 2. An increase in the damping force at both wheels on an axle thus results in an increase in the maximum lateral force at the wheel where the spring is compressed, whereas the damping force at the wheel where the spring is extended decreases to a greater extent. This results in a lower overall lateral force. The resulting yaw moment is obtained with the distance of the axle to the center of gravity.

LIST OF REFERENCE SYMBOLS 1 steering angle input
2 device for determining the target slip angle and the target yaw rate
3 device for determining the target yaw moment
4 device for distributing the target yaw moment
5 steering device
6 roll regulation
7 drive regulation
8 stability device
9 speed sensor
10 control for damper 1
11 control for damper 2
12 control for damper 3
13 control for damper 4
LW steering angle
μ friction coefficient
v speed
SSW target slip angle
SGR target yaw rate
SGM target yaw moment
LGM steering yaw moment
AGM drive yaw moment
VAGM existing drive yaw moment $M_{z,dmax}$ maximum rolling yaw moment
$M_{z,dg}$ rolling yaw moment for all dampers
$M_{z,d1}$ rolling yaw moment to be set at first damper
$M_{z,d2}$ rolling yaw moment to be set at second damper
$M_{z,d3}$ rolling yaw moment to be set at third damper
$M_{z,d4}$ rolling yaw moment to be set at fourth damper
$F_{\alpha,i}$ lateral tire force
SLW skew angle
RL wheel load
$F_{z,di}$ damping force
$v_d$ damping speed
I damper current
y y-axis
z z-axis
$\varphi$ roll angle
$F_{y,Aufbau}$ centrifugal force
W rolling pole
$d_W$ rolling damping
$c_W$ rolling stiffness
$J_z$ rolling moment of inertia
SP structural center of gravity
m mass of the structure at the structural center of gravity
$z_W$ rolling leverage
$h_W$ height of the rolling pole above the road surface
$F_W$ chassis
R1 wheel 1
R2 wheel 2
$F_{z1}$ force of wheel 1 along z-axis
$F_{z2}$ force of wheel 2 along z-axis
$F_{y1}$ force of wheel 1 along y-axis
$F_{y2}$ force of wheel 2 along y-axis
$M_{x,Aufbau}$ rolling torque of the vehicle body about the rolling pole W

The invention claimed is:

1. A method for generating a yaw moment for controlling driving dynamics of a vehicle, comprising:
    determining a target yaw moment for the vehicle from a target yaw rate defined by a predefined steering angle, wherein the target yaw moment is used to maintain the predefined steering angle for the vehicle at a current speed;
    subdividing the target yaw moment into (i) a steering yaw moment associated with a steering of the vehicle, (ii) a rolling yaw moment, and (iii) a drive yaw moment, wherein the rolling yaw moment comprises a sum of individual rolling yaw moments that can be set at each wheel on the vehicle; and
    subdividing the rolling yaw moment into individual rolling yaw moments for individual wheels of the vehicle, wherein the individual rolling yaw moments for each wheel are determined from activation of dampers for the wheels,
    and wherein the rolling yaw moment is dynamically adjusted to control the driving dynamics of the vehicle.

2. The method of claim 1, wherein the determining of the target yaw moment comprises incorporating an existing drive yaw moment and a maximum rolling yaw moment into a distribution for the target yaw moment.

3. The method of claim 2, wherein the rolling yaw moment is measured from the individual wheels of the vehicle and is determined from the target yaw moment and maximum rolling yaw moment.

4. The method of claim 1, further comprising:
    determining a damping force for dampers of the vehicle by modeling the rolling behavior of the vehicle and determining a roll angle ($\varphi$) and its derivations, wherein the damping force caused by an activation of dampers of the vehicle is dynamically distributed to the wheels.

5. The method of claim 1, wherein the individual rolling yaw moments for each wheel are determined from an individual current feed to dampers of the vehicle.

6. The method of claim 5, further comprising estimating a speed with which the dampers move the wheels, wherein the current feed to the dampers is determined from the damper speed.

7. An apparatus for generating a yaw moment for controlling the driving dynamics of a vehicle, comprising:
    a first device for determining a target slip angle and a target yaw rate from a steering angle;
    a second device for determining a target yaw moment from the target slip angle and the target yaw rate; and
    a third device for subdividing the target yaw moment into (i) a steering yaw moment of a steering device, (ii) a rolling yaw moment of a rolling control, and (iii) a drive yaw moment of a drive control, wherein the rolling yaw moment comprises a sum of individual rolling yaw moments that can be set at each wheel on the vehicle,
    wherein the rolling control is configured to subdivide the rolling yaw moment into individual rolling yaw moments for individual wheels of the vehicle wherein the individual rolling yaw moments for each wheel are determined from activation of dampers for the wheels,
    and wherein the rolling yaw moment is dynamically adjusted to control the driving dynamics of the vehicle.

8. The apparatus of claim 7, wherein the individual rolling yaw moments for the individual wheels are determined by different current feeds to individual dampers for the respective wheels.

9. A method for generating a yaw moment for controlling driving dynamics of a vehicle, comprising:
    determining a target yaw moment for the vehicle from a target yaw rate defined by a predefined steering angle, wherein the target yaw moment is used to maintain the predefined steering angle for the vehicle at a current speed;
    subdividing the target yaw moment into (i) a steering yaw moment associated with a steering of the vehicle, (ii) a rolling yaw moment, and (iii) a drive yaw moment, wherein the rolling yaw moment comprises a sum of individual rolling yaw moments that can be set at each wheel on the vehicle; and
    subdividing the rolling yaw moment into individual rolling yaw moments for individual wheels of the vehicle, wherein the individual rolling yaw moments for each wheel are determined from activation of dampers for the wheels, and is determined from the target yaw moment and a maximum rolling yaw moment
    and wherein the rolling yaw moment is dynamically adjusted to control the driving dynamics of the vehicle, wherein the rolling yaw moment comprises a sum of individual rolling yaw moments that can be set at each wheel on the vehicle.

10. The method of claim 9, wherein the determining of the target yaw moment comprises incorporating an existing drive yaw moment and a maximum rolling yaw moment into a distribution for the target yaw moment.

11. The method of claim 9, wherein the individual rolling yaw moments for each wheel are determined from an individual current feed to dampers of the vehicle.

12. The method of claim 11, further comprising estimating a speed with which the dampers move the wheels, wherein the current feed to the dampers is determined from the damper speed.

13. The method of claim 9, further comprising:
   determining a damping force for dampers of the vehicle by modeling the rolling behavior of the vehicle and determining a roll angle ($\varphi$) and its derivations, wherein the damping force caused by the activation of dampers of the vehicle is dynamically distributed to the wheels.

* * * * *